(12) United States Patent
Tsurumi

(10) Patent No.: US 10,767,542 B2
(45) Date of Patent: Sep. 8, 2020

(54) EXHAUST GAS SAMPLING APPARATUS, EXHAUST GAS ANALYSIS SYSTEM, EXHAUST GAS SAMPLING METHOD, AND EXHAUST GAS SAMPLING PROGRAM

(71) Applicant: HORIBA, Ltd., Kyoto (JP)

(72) Inventor: Kazuya Tsurumi, Kyoto (JP)

(73) Assignee: HORIBA, LTD., Kyoto (JP)

( * ) Notice: Subject to any disclaimer, the term of this patent is extended or adjusted under 35 U.S.C. 154(b) by 0 days.

(21) Appl. No.: 16/155,674

(22) Filed: Oct. 9, 2018

(65) Prior Publication Data

US 2019/0195113 A1 Jun. 27, 2019

(30) Foreign Application Priority Data

Dec. 27, 2017 (JP) ................. 2017-252486

(51) Int. Cl.
*F01N 11/00* (2006.01)
*G01N 1/22* (2006.01)

(52) U.S. Cl.
CPC ......... *F01N 11/007* (2013.01); *G01N 1/2252* (2013.01); *G01N 2001/2255* (2013.01)

(58) Field of Classification Search
CPC ................ F01N 11/007; G01N 1/2252; G01N 2001/2255
See application file for complete search history.

(56) References Cited

U.S. PATENT DOCUMENTS

| 7,559,262 | B2* | 7/2009 | Silvis | .................... | G01N 1/2252 73/863.01 |
| 2005/0056103 | A1* | 3/2005 | Hirai | .................... | G01N 1/2252 73/864.51 |
| 2010/0000339 | A1* | 1/2010 | Silvis | .................... | G01N 1/2252 73/863.01 |
| 2011/0252864 | A1* | 10/2011 | Guenther | ............. | G01N 1/2252 73/23.31 |
| 2017/0074756 | A1* | 3/2017 | Williamson | .......... | G01M 15/10 |

FOREIGN PATENT DOCUMENTS

EP 0959339 A2 11/1999
JP 2010-139340 A 6/2010

OTHER PUBLICATIONS

EESR dated Apr. 16, 2019 issued for European Patent Application No. 18 197 117.7, 9 pgs.

* cited by examiner

*Primary Examiner* — Matthew T Largi
(74) *Attorney, Agent, or Firm* — Brooks Kushman P.C.

(57) ABSTRACT

To provide an exhaust gas analysis system that can accurately analyze exhaust gas discharged from an engine of a hybrid vehicle and can also be applied to a test that continues sampling into a sampling bag over a predetermined sampling time, a sampling apparatus is adapted to include a main flow path through which the exhaust gas flows, a sampling flow path that is connected to the main flow path to sample the exhaust gas into a sampling bag, and a constant flow rate mechanism that is provided in the main flow path and configured to be able to change a main flow rate that is an exhaust gas flow rate through the main flow path. Additionally, a control device is adapted to control the constant flow rate mechanism to change the main flow rate and change a sampling flow rate that is an exhaust gas flow rate through the sampling flow path.

13 Claims, 4 Drawing Sheets

EXHAUST GAS SAMPLING APPARATUS, EXHAUST GAS ANALYSIS SYSTEM, EXHAUST GAS SAMPLING METHOD, AND EXHAUST GAS SAMPLING PROGRAM

CROSS-REFERENCE TO RELATED APPLICATION

This application claims priority to Japanese Application No. 2017-252486, filed Dec. 27, 2017, the disclosure of which is incorporated in its entirety by reference herein.

TECHNICAL FIELD

The present invention relates to an exhaust gas sampling apparatus, an exhaust gas analysis system, an exhaust gas sampling method, and an exhaust gas sampling program.

BACKGROUND ART

As this sort of exhaust gas analysis system, there is one including a constant volume sampling apparatus (hereinafter also referred to as a CVS apparatus) that controls mixed gas produced by mixing diluent gas in exhaust gas discharged from an engine to have a constant flow rate, and samples the mixed gas into a sampling bag.

When analyzing exhaust gas from a hybrid vehicle (HEV or PHEV) using the CVS apparatus, if even at the time of stopping an engine, mixed gas continues to be sampled into the sampling bag in the same manner as at the time of operating the engine, only the diluent gas is sampled at the time of stopping the engine, and therefore the exhaust gas in the sampling bag is diluted. As a result, an S/N ratio at the time of analyzing the sampled exhaust gas decreases to reduce analysis accuracy.

Therefore, Patent Literature 1 describes a method for, in order to prevent sampled exhaust gas from being diluted when an engine is stopped, stopping sampling into a sampling bag when the engine is stopped.

However, since the method as described above stops the sampling into the sample bag when the engine is stopped, a sampling amount in the sampling bag decreases, and therefore there occurs a problem that on occasions such as when introducing sampled exhaust gas into, for example, various analyzers, the amount of the exhaust gas is insufficient.

Further, the sampling into the sampling bag is stopped when the engine is switched from an operation state to a stop state, and therefore the exhaust gas remains in a flow path and the like constituting a CVS apparatus, thus possibly causing a measurement error.

In addition, some test may prescribe the continuation of sampling into a sampling bag over a predetermined sampling time (e.g., 505 seconds) at, for example, a flow rate proportional to a main flow rate of a CVS apparatus, and for such a test, the above method cannot be employed.

CITATION LIST

Patent Literatures

Patent Literature 1: Japanese Unexamined Patent Application Publication No. 2010-139340

SUMMARY OF INVENTION

Technical Problem

Therefore, the present invention has been made in order to solve the above-described problems at once and a main object thereof is to provide an exhaust gas analysis system that can accurately analyze exhaust gas discharged from an engine of a hybrid vehicle, and can also be used for a test that continues sampling into a sampling bag over a predetermined sampling time.

Solution to Problem

That is, the exhaust gas analysis system according to the present invention includes an exhaust gas sampling apparatus adapted to sample exhaust gas discharged from a vehicle having an engine or from a part of the vehicle into a sampling bag, and the exhaust gas sampling apparatus includes: a main flow path through which the exhaust gas flows; a sampling flow path that is connected to the main flow path to sample the exhaust gas into the sampling bag; a flow rate changeable mechanism that is provided in the main flow path and configured to be able to change a main flow rate that is an exhaust gas flow rate through the main flow path; and a control device that on the basis of whether the engine is in an operation state or in a stop state, controls the flow rate changeable mechanism to change the main flow rate, as well as change a sampling flow rate that is an exhaust gas flow rate through the sampling flow path.

Note that the exhaust gas sampled into the sampling bag includes raw exhaust gas discharged from the engine and diluted exhaust gas produced by mixing the raw exhaust gas with diluent gas. The vehicle having the engine or the part of the vehicle is not necessarily limited to a finished vehicle, but may be a drive train having the engine.

The exhaust gas sampling apparatus configured as described above can suppress the exhaust gas in the sampling bag from being diluted while even when the engine is stopped, continuing the sampling into the sampling bag by changing the sampling flow rate at the time of stopping the engine to a smaller flow rate than the sampling flow rate at the time of operating the engine.

In doing so, a reduction in S/N ratio due to dilution of the exhaust gas in the sampling bag can be suppressed, and also a sufficient sampling amount can be ensured. In addition, the exhaust gas can be prevented from remaining in flow paths and the like constituting the exhaust gas sampling apparatus, and the exhaust gas sampling apparatus can also be used for a test that continues sampling into a sampling bag over a predetermined sampling time.

In order to make it possible to change the sampling flow rate at the time of stopping the engine to a smaller flow rate than the sampling flow rate at the time of operating the engine, it is preferable that when the engine is in the operation state, the control device changes the main flow rate to a first main flow rate, and when the engine is in the stop state, changes the main flow rate to a second main flow rate that is a smaller flow rate than the first main flow rate.

More specifically, it is preferable that when the engine is in the operation state, the control device changes the sampling flow rate to a first sampling flow rate, and when the engine is in the stop state, changes the sampling flow rate to a second sampling flow rate that is a smaller flow rate than the first sampling flow rate.

In order to ensure analysis accuracy, it is preferable that even when the engine is in any of the operation state and the stop state, the control device controls a ratio between the main flow rate and the sampling flow rate to be constant.

Specific embodiments include one configured such that a diluent gas flow path through which diluent gas flows is connected to an upstream side of the sampling flow path in the main flow path, and the exhaust gas diluted with the diluent gas or the diluent gas flows through the sampling flow path and the flow rate changeable mechanism.

As a configuration making the main flow rate changeable, a configuration making switchable a main venturi and a sub-venturi respectively having different critical flow rates and provided in parallel to each other can be cited.

In such a configuration, when attempting to alternatively flow the mixed gas through any of the main venturi and the sub-venturi depending on switching between the engine operation state and the engine stop state, the main flow rate does not immediately settle after switching a venturi, and during a transient period after the switching, the ratio (split flow ratio) of the sampling flow rate to the main flow rate cannot be accurately controlled.

Therefore, it is preferable that the flow rate changeable mechanism includes: a main venturi and a sub-venturi, which respectively have different critical flow rates and are provided in parallel to each other; and a switching mechanism adapted to flow the exhaust gas through one or both of the main venturi and the sub-venturi, and when the engine switches from the stop state to the operation state, the control device controls the switching mechanism so that the exhaust gas flows through the main venturi and the sub-venturi, and when the engine switches from the operation state to the stop state, controls the switching mechanism so that the exhaust gas flows through the sub-venturi.

In such a configuration, depending on the switching between the engine operation state and the engine stop state, it is switched whether to flow the exhaust gas through the main venturi, and therefore the switching operation of the main flow rate is relatively simple. In doing so, the flow rate of the mixed gas after switching the main flow rate settles relatively quickly, and therefore the ratio of the sampling flow rate to the main flow rate can be accurately controlled.

When the main flow rate in the engine stop state is too large, the exhaust gas sampled into the sampling bag is diluted too much to fail to ensure analysis accuracy, whereas when the main flow rate in the engine stop state is too small, the sampling amount of the exhaust gas sampled into the sampling bag is too small, resulting in insufficiency of the exhaust gas.

Therefore, it is preferable that the main flow rate when the engine is in the stop state is equal to or more than $1/10$ of and equal to or less than $1/4$ of the main flow rate when the engine is in the operation state. Such setting makes it possible to sufficiently sample the exhaust gas while ensuring the analysis accuracy.

In order to automate switching of the main flow rate, it is preferable that the control device includes: an engine state reception part that receives engine state information indicating whether the engine is in the operation state or in the stop state; and a flow rate switching part that switches the main flow rate on the basis of the engine state information.

More specific embodiments include the exhaust gas sampling apparatus further including engine state information acquisition means adapted to acquire the engine state information, in which the engine state reception part is configured to receive the engine state information outputted from the engine state information acquisition means, and the engine state information acquisition means is an ECU mounted in the vehicle, a flowmeter that measures a flow rate of the exhaust gas, or an exhaust gas analyzer that analyzes a component contained in the exhaust gas.

This makes it possible to use, as the engine state information, various pieces of information outputted from the ECU, a flow rate value detected by the flowmeter, or analysis results such as the concentration of a predetermined component measured by the exhaust gas analyzer.

As long as the vehicle or the part of the vehicle has the engine and a power source other than the engine, and when the engine is in the stop state, the power source other than the engine is in an operation state, working effects according to the present invention are more clearly produced In addition, an exhaust gas analysis system including: the above-described exhaust gas sampling apparatus; and an exhaust gas analysis device that analyzes exhaust gas sampled into the sampling bag is also included in the present invention.

Also, an exhaust gas sampling method according to the present invention is one using a sampling apparatus adapted to sample exhaust gas discharged from a vehicle having an engine or from a part of the vehicle into a sampling bag, and the sampling apparatus includes: a main flow path through which the exhaust gas flows; a sampling flow path that is connected to the main flow path to sample the exhaust gas into the sampling bag; and a flow rate changeable mechanism that is provided in the main flow path and configured to be able to change a main flow rate that is an exhaust gas flow rate through the main flow path. In addition, depending on whether the engine is in an operation state or in a stop state, the method controls the flow rate changeable mechanism to change the main flow rate, as well as changes a sampling flow rate that is an exhaust gas flow rate through the sampling flow path.

Further, an exhaust gas sampling program is a program used together with a sampling apparatus adapted to sample exhaust gas discharged from a vehicle having an engine or from a part of the vehicle into a sampling bag, and the sampling apparatus includes: a main flow path through which the exhaust gas flows; a sampling flow path that is connected to the main flow path to sample the exhaust gas into the sampling bag; and a flow rate changeable mechanism that is provided in the main flow path and configured to be able to change a main flow rate that is an exhaust gas flow rate through the main flow path. In addition, the program instructs a computer to fulfil a function of, depending on whether the engine is in an operation state or in a stop state, controlling the flow rate changeable mechanism to change the main flow rate, as well as change a sampling flow rate that is an exhaust gas flow rate through the sampling flow path.

Such exhaust gas sampling method and exhaust gas sampling program make it possible to produce the same working effects as those of the above-described exhaust gas sampling apparatus.

Advantageous Effects of Invention

The present invention configured as described above can accurately analyze exhaust gas discharged from an engine of a hybrid vehicle, and can also be applied to a test that continues sampling into a sampling bag over a predetermined sampling time.

DESCRIPTION OF EMBODIMENTS

In the following, one embodiment of the exhaust gas analysis system according to the present invention will be described with reference to drawings.

An exhaust gas analysis system 100 of the present embodiment is one that is used to perform component analysis of exhaust gas discharged from an engine of a hybrid vehicle having the engine and an electric motor (motor) as a test vehicle such as HEV or PHEV, fuel consumption measurement, and the like, and of a dilution sampling type that dilutes the exhaust gas with diluent gas to perform concentration measurement. Note that the exhaust gas analysis system 100 may be one of a direct sampling type that samples the exhaust gas discharged from the engine without diluting the exhaust gas. Also, a test target is not limited to a finished vehicle, but may be a drive train having an engine and an electric motor (motor).

Figure 1:
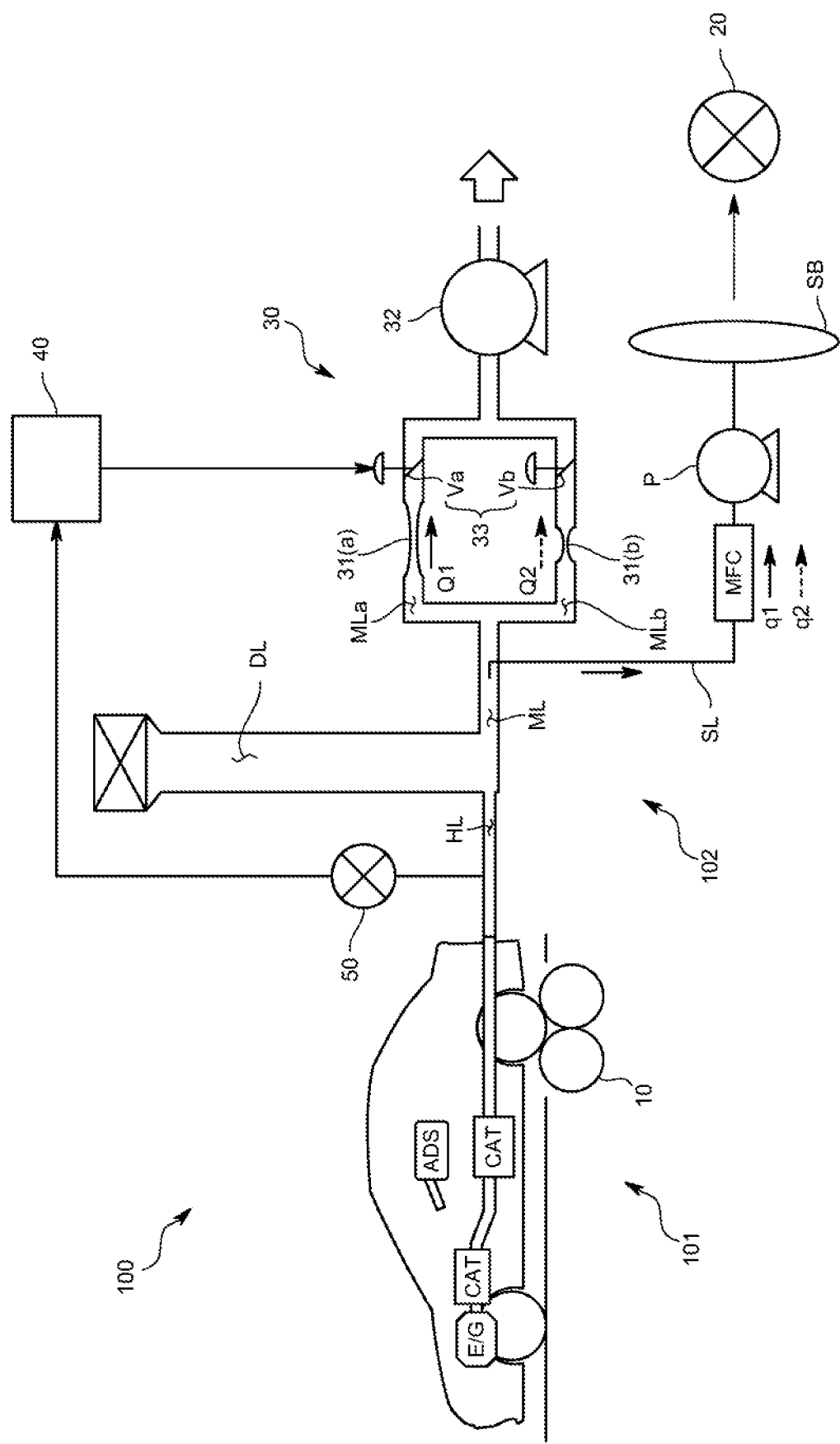
FIG. 1 is a schematic diagram illustrating the configuration of an exhaust gas analysis system in a present embodiment.

Specifically, as illustrated in FIG. 1, the exhaust gas analysis system 100 includes: a chassis dynamometer 101 having chassis rollers 10 on which the test vehicle is placed: and an exhaust gas sampling apparatus 102, and is one that samples mixed gas produced by diluting the exhaust gas with the diluent gas (diluted exhaust gas) into a sampling bag SB and measures the concentrations of various components contained in the mixed gas by an analyzer 20 such as NDIR or FID. Note that although FIG. 1 illustrates the one analyzer 20, the exhaust gas analysis system 100 preferably includes multiple analyzers 20.

The exhaust gas sampling apparatus 102 is a constant volume sampling apparatus referred to as a so-called CVS apparatus, and includes: an exhaust gas flow path HL through which the exhaust gas discharged from the engine flows; a diluent gas flow path DL through which dilution air (the diluent gas) resulting from refinement by, for example, a dilution air refining device DAR flows; a main flow path ML that is connected with the exhaust gas flow path HL and the diluent gas flow path DL and through which the mixed gas of the exhaust gas and the diluent gas (diluted exhaust gas) flows; a constant flow rate mechanism 30 connected to the main flow path ML; and a control device 40 that controls the constant flow rate mechanism 30.

The main flow path ML is connected with a sampling flow path SL for sampling the mixed gas into the sampling bag SB, and the sampling flow path SL is provided with a mass flow controller MFC as a flow rate controller and a suction pump P such as a blower.

The constant flow rate mechanism 30 is one that regulates a main flow rate (hereinafter referred to as a CVS flow rate), which is the total flow rate of the exhaust gas introduced into the exhaust gas flow path HL and the diluent gas introduced into the diluent gas flow path DL, to a constant flow rate, and specifically includes: critical flow venturis 31 (CFVs) provided downstream of the main flow path ML; and a suction pump 32 provided downstream of the critical flow venturis 31. The CVS flow rate in the present embodiment refers to a flow rate on the lower downstream side than the sampling flow path SL connecting point in the exhaust gas flow path HL. Such a configuration allows the total flow rate of the exhaust gas and the diluent gas to be regulated to the CVS flow rate by controlling the differential pressure between the upstream side and downstream side of the critical flow venturis 31 to a required value or more using the suction pump 32. In addition, the mixed gas suctioned by the suction pump 32 is emitted outside.

Further, the constant flow rate mechanism 30 in the present embodiment is a flow rate changeable mechanism configured to be able to change the CVS flow rate.

Specifically, the constant flow rate mechanism 30 has the multiple critical flow venturis 31 respectively having different critical flow rates, and these critical flow venturis 31 are connected mutually in parallel. That is, the main flow path ML in the present embodiment branches into multiple branch flow paths MLa and MLb, i.e., a first branch flow path MLa and a second branch flow path MLb, and these branch flow paths MLa and MLb are respectively provided with the critical flow venturis 31. In the present embodiment, the numbers of the branch flow paths MLa and MLb and of the critical flow venturis 31 are two, and in the following, a critical flow venturi 31 provided in the first branch flow path MLa and having a larger critical flow rate is referred to as a main venturi 31a, and a critical flow venturi 31 provided in the second branch flow path MLb and having a smaller critical flow rate is referred to as a sub-venturi 31b. In addition, the critical flow rate of the main venturi 31a is, for example, 12 [$m^3$/min], and the critical flow rate of the sub-venturi 31b is, for example, 2 [$m^3$/min].

Also, the constant flow rate mechanism 30 further includes a switching mechanism 33 adapted to, in order to flow the mixed gas through at least one of the main venturi 31a and the sub-venturi 31b, switch to at least one flow path MLa, MLb through which the mixed gas is to flow.

The switching mechanism 33 is configured to include on-off valves Va and Vb such as butterfly valves respectively provided on the downstream sides of the main venturi 31a and sub-venturi 31b in the branch flow paths ML1 and MLb, and these on-off valves Va and Vb are subjected to an on-off operation in accordance with an on-off signal outputted from the below-described control device 40. In addition, it is not necessarily required to provide the on-off valve Vb corresponding to the sub-venturi 31b.

Figure 2:
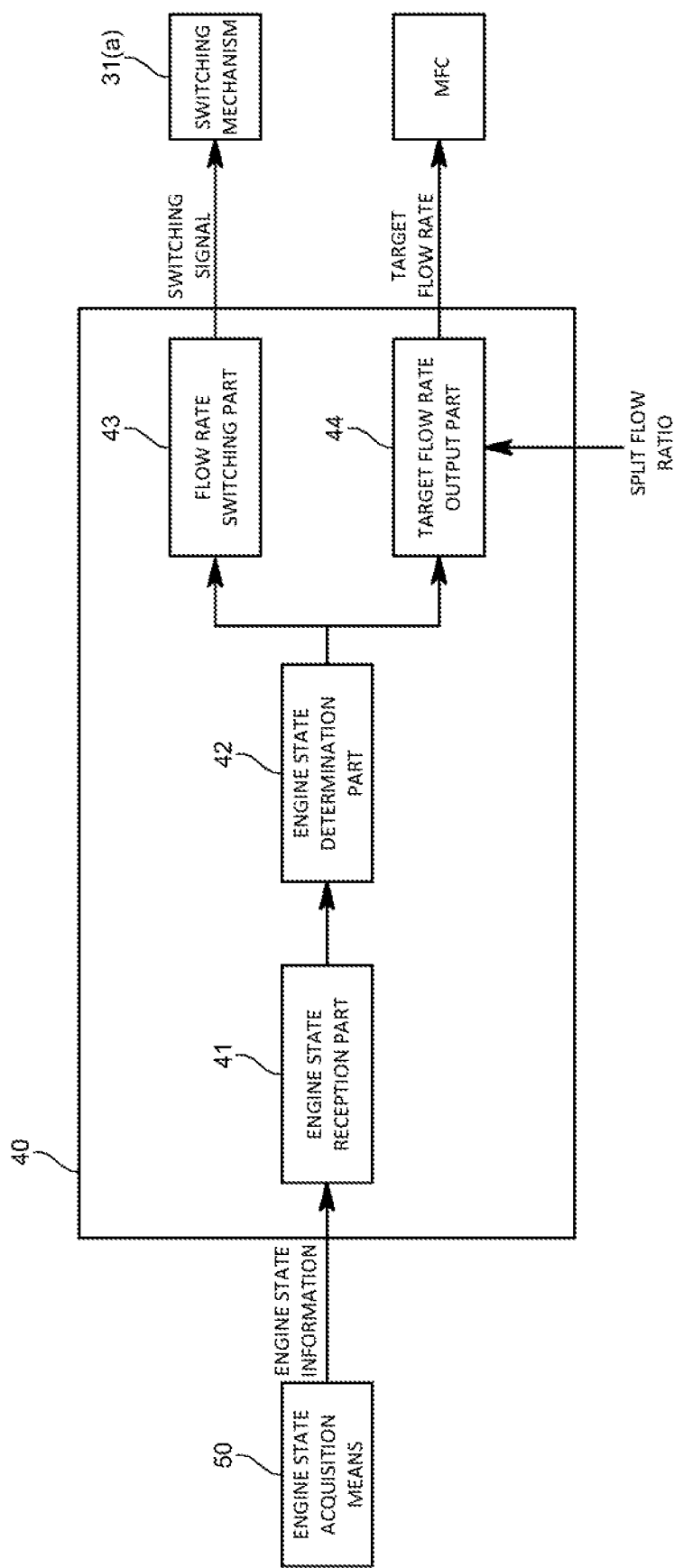
FIG. 2 is a functional block diagram illustrating functions of a control device in the present embodiment.

The control device 40 is a computer having a CPU, a memory, an A/D converter, a communication interface, input means, and the like, and as illustrated in FIG. 2, configured to fulfill functions as an engine state reception part 41, engine state determination part 42, flow rate switching part 43, and target flow rate output part 44 in such a manner that the CPU executes a program stored in the memory.

Figure 3:
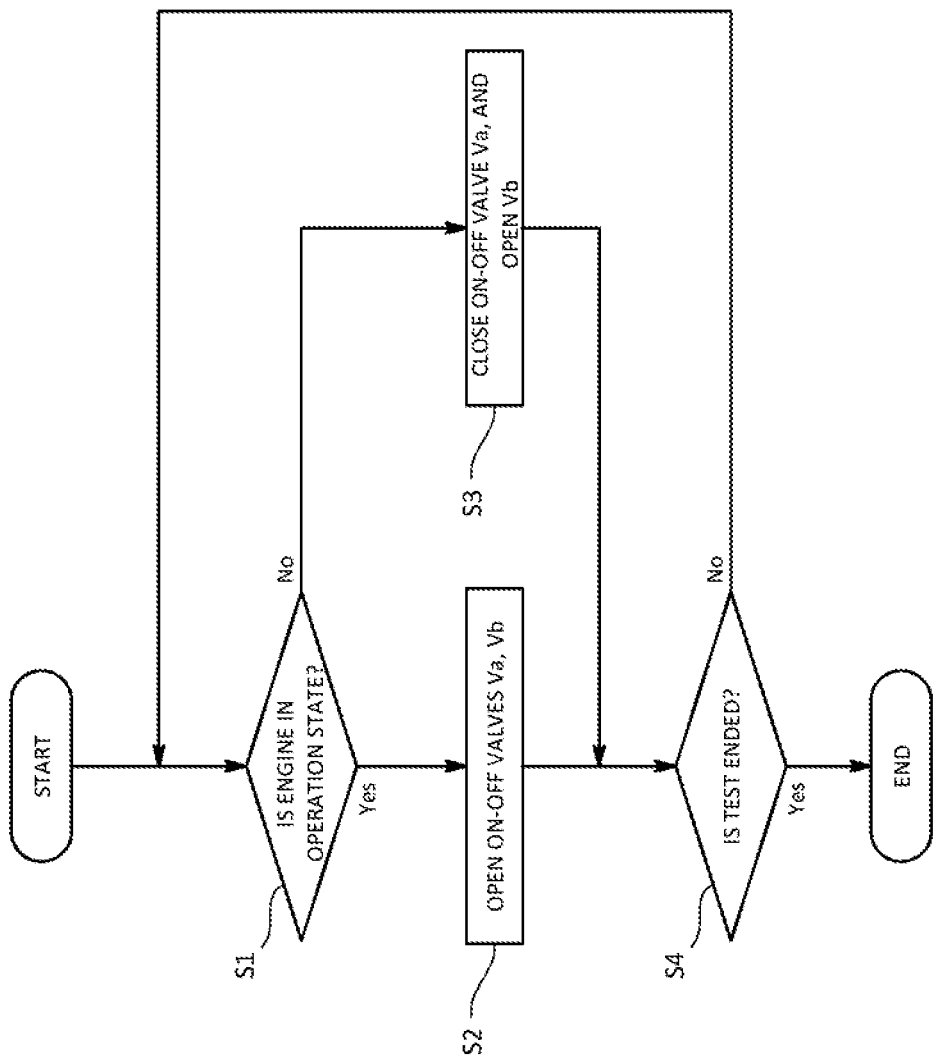
FIG. 3 is a flowchart illustrating control contents of the control device in the present embodiment.

In the following, with reference to a flowchart of FIG. 3, the operation of the control device 40 will be described while also describing the respective parts.

First, when a running test is started, the engine state reception part 41 receives engine state information indicating whether the engine is in an operation state or a stop state. In addition, when the engine is in the operation state, the test vehicle operates using only the engine as a power source or using both the engine and the electric motor (motor) as a power source, whereas when the engine is in the stop state, the test vehicle operates using the electric motor (motor) as a power source.

In the present embodiment, the exhaust gas analysis system 100 further includes engine state acquisition means 50 for acquiring the above-described engine state information.

The engine state acquisition means 50 is one adapted to, as the engine state information, among various pieces of information acquirable during the running test, acquire information whose contents such as a value and ON/OFF are changed depending on whether the engine is in the operation state or in the stop state. The engine state acquisition means 50 here is one for measuring a physical quantity that is changed depending on the presence or absence of the exhaust gas flowing through the exhaust gas flow path HL. Specifically, the engine state acquisition means 50 is, for example, a concentration meter that is provided in the exhaust gas flow path HL to measure the concentration of a predetermined component such as $CO_2$ contained in the exhaust gas, and successively outputs the resulting measured value to the engine state reception part 41 as the engine state information.

Then, the engine state determination part 42 determines on the basis of the engine state information whether the engine is in the operation state or in the stop state (S1). Specifically, the engine state determination part 42 is configured to compare a measured value indicated by the engine state information with a preset threshold value and thereby determine whether the engine is in the operation state or in the stop state. Here, when the $CO_2$ concentration measured by the concentration meter is equal to or more than the threshold value, the engine state determination part 42 determines that the engine is in the operation state, whereas when the $CO_2$ concentration is less than the threshold value, the engine state determination part 42 determines that the engine is in the stop state. In addition, the threshold value may be appropriately changed, but here is set to 0.5%.

Subsequently, when the engine is switched from the stop state to the operation state, the flow rate switching part 43 regulates the CVS flow rate to a first flow rate Q1+Q2, whereas when the engine is switched from the operation state to the stop state, the flow rate switching part 43 regulates the CVS flow rate to a second flow rate Q2.

Specifically, the flow rate switching part 43 is configured to, when it is determined that the engine is in the operation state (S1: Yes), output the on-off signal to the respective on-off valves Va and Vb in order to flow the mixed gas through at least the main venturi 31a, and here by opening both the on-off valve Va and the on-off valve Vb, the mixed gas flows through both the main venturi 31a and the sub-venturi 31b (31b). In doing so, when the engine is in the operation state, the CVS flow rate is regulated to the first flow rate Q1+Q2.

At this time, the target flow rate output part 44 outputs a preliminarily calculated first sampling flow rate q1 to the mass flow controller MFC as a target flow rate in the engine operation state. In doing so, a split flow ratio that is the ratio between the CVS flow rate and the sampling flow rate becomes q1/Q1+Q2. Examples of a method for calculating the first sampling flow rate q1 include a method that when the exhaust gas continues to be sampled at the first sampling flow rate q1 over a predetermined sampling time (e.g., 505 seconds), calculates the first sampling flow rate q1 so that 70 to 95% of the exhaust gas, preferably about 90% of the exhaust gas is stored in the sampling bag SB.

On the other hand, when it is determined that the engine is in the stop state (S1: No), the flow rate switching part 43 outputs the on-off signal to the respective on-off valves Va and Vb in order to stop the mixed gas from flowing through the main venturi 31a. In the present embodiment, by closing the on-off valve Va and also keeping opening the on-off valve Vb, the mixed gas flows through the sub-venturi 31b without flowing through the main venturi 31a (S3). In doing so, when the engine is in the operation state, the CVS flow rate is regulated to the second flow rate Q2.

At this time, the target flow rate output part 44 outputs a second sampling flow rate q2, which was preliminarily calculated so as to obtain an equal split flow ratio between the engine stop state and the engine operation state, i.e., to obtain a split flow ratio of q1/Q1+Q2, to the mass flow controller MFC as a target flow rate in the engine operation state. In doing so, the split flow ratio that is the ratio between the CVS flow rate and the sampling flow rate becomes q2/Q2, and this split flow ratio is equal to the above-described ratio of q1/Q1+Q2.

Note that in the present embodiment, to calculate the second sampling flow rate q2, an index second sampling flow rate q2' is first calculated. Example of a method for calculating the index second sampling flow rate q2' include a method that calculates the index second sampling flow path q2' on the basis of the minimum operation time, which is the shortest time period during which the engine is in the operation state, and the minimum sampling amount at the end of sampling, which is necessary to ensure analysis accuracy. More specifically, given that the sampling time is T, the minimum operation time is t, and the minimum sampling amount is v, the index second sampling flow rate q2' only has to be set so as to satisfy the following expression.

$$q2' > (v - q1 \times (t/0)) \times (60/(T-t)) \qquad (1)$$

Further, the sub-venturi 31b is selected so that the second sampling flow rate q2 calculated on the basis of the critical flow rates of the available critical flow venturis and the above-described split flow ratio becomes equal to or more than the index second sampling flow rate q2'. As a result, the split flow ratio is made equal between the engine stop state and the engine operation state, and at the same time, the second sampling flow path q2 satisfies Expression (1) above.

Meanwhile, when the second flow rate Q2 is too large, the exhaust gas sampled into the sampling bag SB is diluted too much to fail to ensure the analysis accuracy, whereas when the second flow rate Q2 is too small, the sampling amount of the exhaust gas sampled into the sampling bag SB is too small, resulting in insufficiency of the exhaust gas used for analysis.

Therefore, the second flow rate Q2 is preferably equal to or more than 1/10 of and equal to or less than 1/4 of the first flow rate Q1+Q2, and more preferably, approximately 1/6 of the first flow rate Q1+Q2.

After that, it is determined whether the control device 40 has received an end signal for ending the running test (S4), and until the running test is ended, S1 to S3 are repeated.

In the exhaust gas analysis system 100 according to the present embodiment configured as described above, since the CVS flow rate (second flow rate Q2) in the engine stop state is a smaller flow rate than the CVS flow rate (first flow rate Q1+Q2) in the engine operation state, and therefore even when the engine is in the stop state, while continuing the sampling into the sampling bag SB, the exhaust gas in the sampling bag SB can be suppressed from being diluted. This makes it possible to suppress a reduction in S/N ratio due to dilution of the exhaust gas in the sampling bag SB, as well as ensure a sufficient sampling amount.

In addition, when the engine is in the stop state as well, the sampling into the sampling bag SB is continued, and therefore the exhaust gas can be prevented from remaining in the exhaust gas flow path HL, the mixed gas flow path, and the like constituting the exhaust gas sampling apparatus.

Further, the exhaust gas sampling apparatus can also be used for a test that continues sampling into a sampling bag SB over a predetermined sampling time.

Also, depending on the switching between the engine operation state and the engine stop state, the on-off valve Va corresponding to the main venturi 31a is switched on/off with the on-off valve Vb corresponding to the sub-venturi 31b remaining opened, and therefore as compared with when switching on/off both the on-off valves Va and Vb, the switching operation is simple. In doing so, after switching the CVS flow rate depending on the switching between the engine operation state and the engine stop state, the flow rate of the mixed gas settles relatively quickly, and the ratio of the sampling flow rate to the CVS flow rate can be accurately controlled.

Further, since the second flow rate Q2 is equal to or more than 1/10 of and equal to or less than 1/4 of the first flow rate Q1+Q2, the exhaust gas sampled into the sampling bag SB can be prevented from being diluted too much, and also the sampling amount of the exhaust gas sampled into the sampling bag SB can be prevented from being too small. Accordingly, the exhaust gas can be sufficiently sampled while ensuring the analysis accuracy.

Note that the present invention is not limited to the above-described embodiment.

Figure 4:
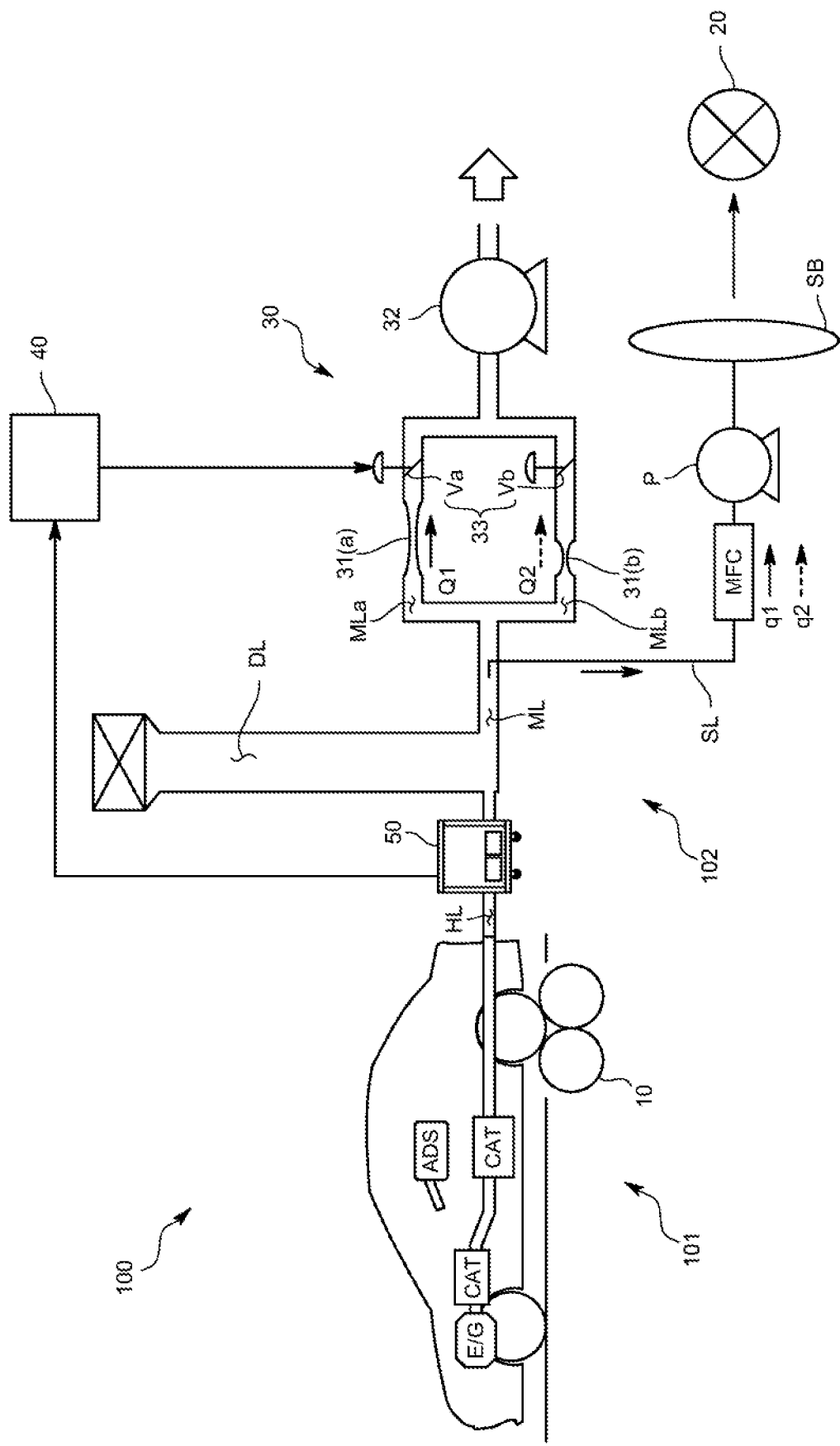
FIG. 4 is a schematic diagram illustrating the configuration of an exhaust gas analysis system in another embodiment.

For example, in the above-described embodiment, the engine state acquisition means 50 is described as the exhaust gas analyzer such as a concentration meter, but as illustrated in FIG. 4, may be, for example, a flowmeter provided in the exhaust gas flow path HL. In this case, the threshold value for determining whether the engine is in the operation state or in the stop state is, for example, 0.2 [m$^3$/min] although it may be appropriately changed.

In addition, the exhaust gas analyzer or the flowmeter as the engine state acquisition means 50 may be provided in the main flow path, but in order to quickly determine whether the engine is in the operation state or in the stop state, is preferably provided in the exhaust gas flow path HL rather than in the main flow path ML.

Further, the engine state reception part 41 may be one that receives various pieces of information such as an engine on/off signal from an ECU mounted in a vehicle. In this case, the ECU corresponds to the engine state acquisition means 50.

In addition, the exhaust gas analysis system 100 may be one including multiple types of engine state acquisition means 50.

The flow rate switching part 43 in the above-described embodiment opens the on-off valves Va and Vb when the engine is in the operation state, and when the engine is in the operation state, closes the on-off valve Va and opens the on-off valve Vb. However, the flow rate switching part 43 may open the on-off valve Va and close the on-off valve Vb when the engine is in the operation state, and when the engine is in the operation state, close the on-off valve Va and open the on-off valve Vb. In this case, the split flow ratio in the engine operation state is q1/Q1, whereas the split flow ratio in the engine stop state is q2/Q2, and the split flow ratios in the respective states are preferably equal to each other.

In the above-described embodiment, the sampling flow rates q1 and q2 are controlled by the mass flow controller MFC. However, multiple critical flow venturis respectively having different critical flow rates may be provided in the sampling flow path SL in parallel to make the sampling flow rates q1 and q2 switchable.

The constant flow rate mechanism in the above-described embodiment is of a multistage CVF type that includes the multiple critical flow venturis 31 and by switching to at least one the critical flow venturi 31 through which the mixed gas is to flow, switches a constant flow rate of the mixed gas stepwise, but may be the following one. For example, the constant flow rate mechanism may be one of a venturi flowmeter type that uses a venturi as a flowmeter in a range before reaching its critical flow rate, and by feedback-control of the suction pump 32 on the downstream side of the venturi, performs continuous switching within the range equal to or less than the critical flow rate of the venturi. Alternatively, the constant flow rate mechanism may be one of a changeable CFV type that continuously switches a gas flow rate by mechanically changing the area of the throat part of the critical flow venturi 31. Further, the constant flow rate mechanism may be one using critical flow orifices (CFO) in addition to the critical flow venturis 31. In addition, the constant flow rate mechanism may be one of a constant volume pump type not using any critical flow venturi 31. In addition, flow rates may be made variable by providing the branch flow paths MLa and MLb with capillaries or mass flow controllers, or the flow rate may be made variable by differentiating the pipe diameters of the branch flow paths MLa and MLb or by another means.

Further, the exhaust gas sampling apparatus according to the present invention may be applied to an exhaust gas analysis system using a bag mini-diluter that samples part of exhaust gas to dilute it at a constant ratio.

The test vehicle is not limited to a hybrid vehicle, but may be a vehicle having an engine and a power source other than the engine.

Besides, it should be appreciated that the present invention is not limited to the embodiments described above, but can be variously modified without departing from the scope thereof.

REFERENCE SIGNS LIST

100: Exhaust gas analysis system
102: Exhaust gas sampling apparatus
SB: Sampling bag
20: Constant flow rate mechanism
31a: Main venturi
31b: Sub-venturi
33: Switching mechanism
40: Control device
50: Engine state acquisition means

The invention claimed is:

1. An exhaust gas sampling apparatus adapted to collect, into a sampling bag, a sample of exhaust gas discharged from a vehicle having an engine or from a part of the vehicle, the exhaust gas sampling apparatus comprising:
   a main flow path through which the exhaust gas flows;
   a sampling flow path that is connected to the main flow path to collect the sample of the exhaust gas into the sampling bag;
   a flow rate changeable mechanism that is provided in the main flow path and configured to change a main flow rate defined as a gas flow rate through the main flow path; and
   a control device that depending on whether the engine is in an operation state or in a stop state, controls the flow rate changeable mechanism to change the main flow rate, as well as change a sampling flow rate defined as a gas flow rate through the sampling flow path into the sampling bag, wherein when the engine is in the operation state, the control device changes the main flow rate to a first main flow rate, and when the engine is in the stop state, changes the main flow rate to a second main flow rate that is less than the first main flow rate.

2. The exhaust gas sampling apparatus according to claim 1, wherein when the engine is in the operation state, the control device changes the sampling flow rate to a first sampling flow rate, and when the engine is in the stop state, changes the sampling flow rate to a second sampling flow rate that is less than the first sampling flow rate.

3. The exhaust gas sampling apparatus according to claim 1, wherein
even when the engine is in any of the operation state and the stop state, the control device controls a ratio between the main flow rate and the sampling flow rate to be constant.

4. The exhaust gas sampling apparatus according to claim 1, wherein
a diluent gas flow path through which diluent gas flows is connected to an upstream side of the sampling flow path in the main flow path, and
the exhaust gas diluted with the diluent gas or the diluent gas flows through the sampling flow path and the flow rate changeable mechanism.

5. The exhaust gas sampling apparatus according to claim 1, wherein
the main flow path branches into a first branch flow path and a second branch flow path, the first and second branch flow paths having mutually different flow rates,
the flow rate changeable mechanism comprises a switching mechanism adapted to switch between the first branch flow path and the second branch flow path, and
depending on whether the engine is in the operation state or in the stop state, the control device controls the switching mechanism.

6. The exhaust gas sampling apparatus according to claim 1, wherein the flow rate changeable mechanism comprises: a main venturi and a sub-venturi, the main venturi and the sub venturi respectively having different critical flow rates and provided in parallel to each other; and a switching mechanism adapted to flow the exhaust gas through one or both of the main venturi and the sub-venturi, and
when the engine switches from the stop state to the operation state, the control device controls the switching mechanism so that the exhaust gas flows through the main venturi and the sub-venturi and when the engine switches from the operation state to the stop state, controls the switching mechanism so that the exhaust gas flows through the sub-venturi.

7. The exhaust gas sampling apparatus according to claim 1, wherein
the main flow rate when the engine is in the stop state is equal to or more than $1/10$ of and equal to or less than $1/4$ of the main flow rate when the engine is in the operation state.

8. The exhaust gas sampling apparatus according to claim 1, wherein the control device comprises:
an engine state reception part that receives engine state information indicating whether the engine is in the operation state or in the stop state; and
a flow rate switching part that switches the main flow rate on a basis of the engine state information.

9. The exhaust gas sampling apparatus according to claim 8, further comprising
engine state information acquisition means adapted to acquire the engine state information, wherein
the engine state reception part is configured to receive the engine state information outputted from the engine state information acquisition means, and
the engine state information acquisition means is an ECU mounted in the vehicle, a flowmeter that measures a flow rate of the exhaust gas, or an exhaust gas analyzer that analyzes a component contained in the exhaust gas.

10. The exhaust gas sampling apparatus according to claim 1, wherein
the vehicle or the pan of the vehicle has the engine and a power source other than the engine, and
when the engine is in the stop state, the power source other than the engine is in an operation state.

11. An exhaust gas analysis system comprising:
the exhaust gas sampling apparatus according to claim 1; and
an exhaust gas analysis device that analyzes exhaust gas sampled into the sampling bag.

12. An exhaust gas sampling method using a sampling apparatus adapted to collect, into a sampling bag a sample exhaust gas discharged from a vehicle having an engine or from a part of the vehicle, the sampling apparatus including a main how path through which the exhaust gas flows, a sampling flow path that is connected to the main flow path to collect the sample of the exhaust gas into the sampling bag, and a flow rate changeable mechanism that is provided in the main flow path and configured to change a main flow rate defined as a gas flow rate through the main flow path, the method comprising:
depending on whether the engine is in an operation state or in a stop state, controlling the flow rate changeable mechanism to change the main flow rate, as well as change a sampling flow rate defined as a gas flow rate through the sampling flow path into the sampling bag,
changing the main flow rate to a first main flow rate when the engine is in the operation state, and
changing the main flow rate to a second main flow rate that is less than the first main flow rate when the engine is in the stop state.

13. An exhaust gas sampling apparatus adapted to sample exhaust gas discharged from a vehicle having an engine or from a part of the vehicle into a sampling bag, the exhaust gas sampling apparatus comprising:
a main flow path through which the exhaust gas flows;
a sampling flow path that is connected to the main flow path to sample the exhaust gas into the sampling hag;
a flow rate changeable mechanism that is provided in the main flow path and configured to be able to change a main flow rate that is an exhaust gas flow rate through the main flow path; and
a control device that depending on whether the engine is in an operation state or in a stop state, controls the flow rate changeable mechanism to change the main flow rate, as well as change a sampling flow rate that is an exhaust gas flow rate through the sampling flow path, wherein
the main flow path branches into a first branch flow path and a second branch flow path, the first and second branch flow paths having mutually different flow rates,
the flow rate changeable mechanism comprises a switching mechanism adapted to switch between the first branch flow path and the second branch flow path, and
depending on whether the engine is in the operation state or in the stop state, the control device controls the switching mechanism.

* * * * *